July 19, 1960
M. CORDELL
2,945,558
DISPOSABLE FILTER BAG
Filed Jan. 21, 1958
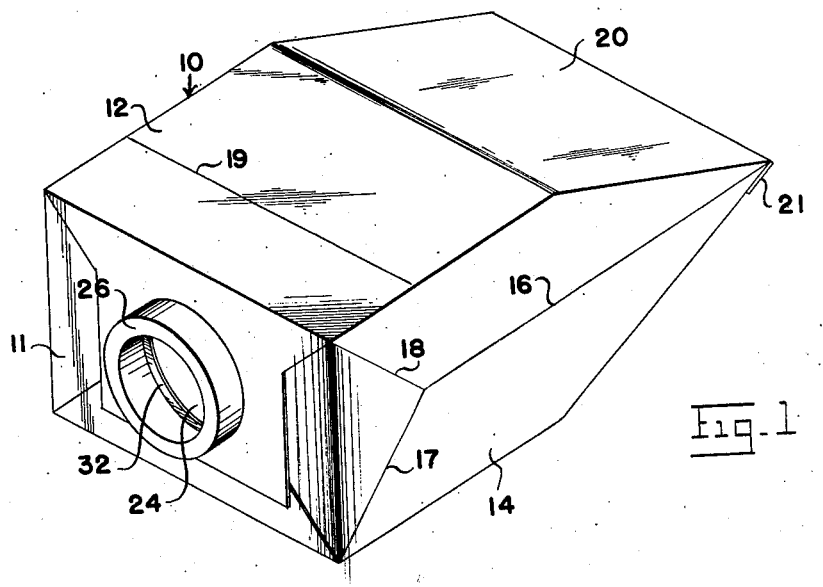
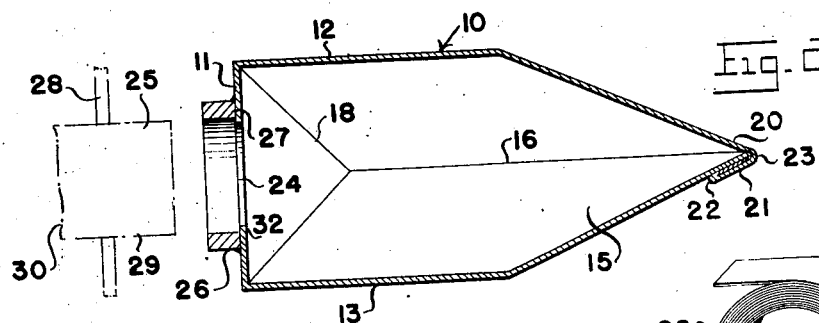
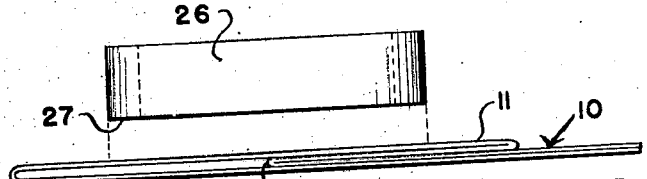
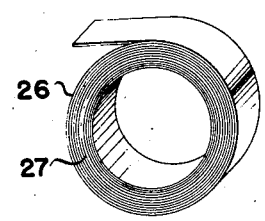
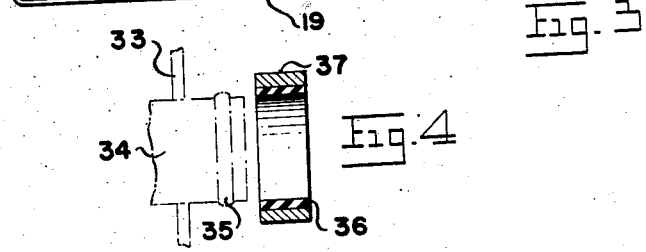
INVENTOR.
MARTIN CORDELL
BY
Abraham Friedman
Atty.

United States Patent Office
2,945,558
Patented July 19, 1960

2,945,558

DISPOSABLE FILTER BAG

Martin Cordell, Far Rockaway, N.Y., assignor to Studley Paper Company, Inc., a corporation of New York Filed Jan. 21, 1958, Ser. No. 710,364

3 Claims. (Cl. 183—51)

This invention relates to disposable type filter bags for use with vacuum cleaning devices and more particularly to mounting means for detachably securing such disposable bag in operative association with the complementary coupling element of a vacuum cleaner.

Disposable type paper filter bags have almost universally replaced the relatively permanent type filter receptacles which previously formed part of vacuum cleaning devices. Disposable filter bags have distinct advantages, both with respect to hygienic considerations and convenience of utilization. In general, a disposable type filter bag for use with vacuum cleaners comprises an enclosure formed of relatively flexible air pervious filter paper or similar material capable of separating the dust, debris and similar material from the air stream in which it is entrained. The bag must be capable of withstanding the strain imposed thereon by the air stream during the operation of the suction cleaner as well as the weight of the waste material received therein during removal and transportation from the cleaner for the purpose of disposal. Additionally, the structure must withstand the abuse to which the filter bag as a whole, and particularly the mounting means thereof, is subjected during the process of securing the filter bag in operative association with the cleaner as well as upon removal therefrom. The aforesaid mounting element must be capable of forming an efficient air seal with the complementary coupling or mounting element provided upon the vacuum cleaner body as well as with the wall of the filter bag receptacle itself. This problem is particularly pronounced in connection with paper type disposable filter bags which usually are formed of a relatively thin and readily frangible sheet material. The mounting means for a filter receptacle formed of this material must be mechanically secured in position thereon in such manner as to provide an effective and firm connection with the wall of the filter bag while minimizing the possibility of the tearing of the filter material during handling or use of the bag. An essential consideration in the provision of the mounting element for disposable filter bags of this type is, of course, economy of manufacture including the use of low cost materials and simple, efficient but inexpensive means for securing the mounting element in position thereon.

In view of the foregoing, it is an object of this invention to provide a filter bag of the disposable type for use in conjunction with vacuum cleaning devices with means for readily and efficiently attaching and removing the filter bag from the complementary means provided upon a vacuum cleaner.

It is also an object of this invention to provide a disposable type filter bag for vacuum cleaners including coupling or mounting means of the character indicated carried thereby, which may be readily and efficiently manufactured at low cost and which may be adhesively assembled with the bag body by low cost mass production methods in an effective and efficient manner.

It is another object of this invention to provide a mounting means of the character indicated, in the nature of a mounting ring or collar, which provides for a more efficient adhesive bond between the collar and the bag wall.

An additional object of this invention is to provide a filter bag of the character indicated wherein a mounting ring or collar is provided which is capable of being readily secured in operative relation with respect to the complementary mounting or coupling means of a vacuum cleaner in such manner as to form an efficient air seal therewith in spite of manufacturing variations in the dimensions of the parts.

It is a further object of this invention to provide a mounting collar for disposable vacuum cleaner filter bag formed of a plurality of laminations of strip material which may be spirally or convolutely wound so as to present a laminar end or edge surface to the bag face wall to which it is secured for the purpose of forming an improved adhesive bond therebetween.

Another object of this invention is to provide a mounting ring or collar of the character indicated wherein the wall thickness and structure is such as to provide for ease and efficiency in the use thereof.

Other and further objects, benefits and advantages of this invention will become apparent from the description thereof contained in the annexed drawings, specifications and claims or will otherwise become obvious. It will be be understood that the invention herein disclosed may be employed for other purposes for which the parts, structure and arrangement are adapted.

In the accompanying drawings:

Figure 1 is a perspective view of a disposable type filter bag incorporating the present invention;

Figure 2 is a cross sectional view of the disposable filter bag shown in Figure 1;

Figure 3 is a side elevational view of the disposable filter bag in accordance with the present invention shown in flat or collapsed position immediately prior to the securement of the mounting collar thereto;

Figure 4 is a cross sectional view of a modified form of mounting collar; and

Figure 5 is a perspective view of the mounting collar showing a layer of material drawn away therefrom to more clearly illustrate the laminar structure thereof.

In its general aspect, the invention comprises an enclosed bag or receptacle which is provided with an inlet aperture surrounded by a mounting ring or collar adapted to be engaged with the complementary inlet conduit of a vacuum cleaner. The dust, dirt and similar debris entrained in the air stream produced by the suction action of the vacuum cleaner is separated and collected within the filter bag which permits the passage of air through the walls thereof. When the dust capacity of the receptacle is reached, it is disengaged from the inlet conduit and may be disposed of without personal contact with the material contained therein.

The disposable filter receptacle comprising the present invention is more particularly illustrated in Figures 1, 2 and 3. From said figures, it may be seen that said disposable receptacle or container is in the form of a conventional type paper bag designated generally by the numeral 10, having a rectangular face wall 11.

The bag also includes side walls 12, 13, 14 and 15. Side walls 14 and 15 are arranged to fold along lines 16, 17 and 18. The gussets formed by fold lines 16, 17 and 18 permit the bag to be collapsed by additionally folding wall 12 along line 19 so as to form a flat relatively planar body as shown in Figure 3. Fabrication processes used in the manufacture of paper bags result in the production of the bags in this collapsed generally planar form. The normally open mouth end 20 of the bag 10 is twice folded over upon itself as shown at 21. These folds are accomplished while the bag is in collapsed, flat or planar condition and all the layers of the sheet material at the bag mouth are therefore simultaneously folded. The three plies of layered sheet material are secured to each other by means of transverse glue lines which are co-extensive with the width of the bag and supplement the seals formed by the bights 22 and 23 to form a highly efficient dust proof seal which prevents the passage of the air entrained dust therethrough during the suction operation and also prevents the finely divided dust material from escaping or sifting through the bag seal as the bag is removed and transported for disposal.

The face wall 11 of the bag is generally rectangular and is provided with an inlet aperture 24. Although the invention herein disclosed is illustrated in connection with the conventional type rectangular bottomed bag, it will be understood that the advantages and benefits thereof may well be derived in bags of other form or configuration to which the structure and arrangement herein disclosed are adapted to be applied. In using the term face wall, it will therefore be understood that reference is intended to be made to that portion of a disposable filter receptacle or bag which is adapted to be positioned in confronting relation with the end of an inlet conduit or equivalent structure provided on the vacuum cleaner for operative association therewith. The aperture 24 may be formed during the fabrication of the bag or it may be accomplished by perforating the face wall after the bag has been formed prior to the enclosure of the mouth end thereof. The aperture 24 is complementary in configuration to the peripheral surface of the end of inlet fitting or conduit 25 upon which the bag is to be mounted. The end of the inlet conduit 25 in a conventional type of vacuum cleaner is usually cylindrical and the opening of aperture 24 is therefore preferably formed with a diameter which is smaller than the outside diameter thereof. The purpose of the foregoing arrangement will more clearly appear hereafter.

Mounted upon the face wall 11 of the bag and surrounding aperture 24 is a mounting ring or collar 26. Said mounting collar 26 comprises an annulus formed of laminated sheet or strip material such as paper or paper board although other similar materials may be advantageously utilized. The collar advantageously comprises a series of convolutions formed of strips of paperboard adhesively secured together. The collar may also be formed as an elongated tube by spirally winding the paperboard around a mandrel or core in order to form a smooth interior surface therefor and thereupon the tube may be cut into suitable lengths. Each collar may, of course, be individually formed. Figure 5 illustrates the mounting collar in perspective showing a layer of the paperboard from which the collar is formed drawn away from the body thereof to illustrate the laminar construction of the collar more clearly. The convolute construction of the ring forming the collar results in a laminar end edge face 27 lying in a trans-axial plane consisting of a series of spiral or ring-like ridges. This end edge surface has been found particularly advantageous for the purpose of forming a highly efficient and secure adhesive bond between the face wall 11 of the bag and the end face 27 of the collar. The structural arrangement of the collar also provides distinct advantages in coupling the mounting collar to the inlet conduit of the vacuum cleaner as will more clearly appear hereafter. Collar 26 is mounted upon the face wall 11 of the bag in the manner illustrated in Figure 3. Upon completion of the fabrication of the bag as shown in Figure 3, it is in collapsed or flat form so that the apertured face wall thereof presents a planar surface. Adhesive is applied to either the surface of end face 27 of the mounting collar, the area of the face wall surrounding the aperture, or both, and the collar is then placed in contact therewith to form an efficient and secure adhesive bond therebetween. It is apparent that this operation is quite simple and in the preferred manner of practising the invention the adhesive is applied to the laminar end surface 27 of the collar 26 by automatic means which also place the collar in position on the face wall of the bag to complete the assembly operation. Figure 3 illustrates the mounting collar in juxtaposition with the face wall of the bag as it is about to be lowered into contact therewith.

The assembled bag 10 is adapted to be mounted upon the complementary coupling or mounting means of a vacuum cleaner. The actual vacuum cleaner construction forms no part of the invention and only so much of the structure thereof as is pertinent to the instant invention is shown in Figure 2. The disposable filter bag comprising this invention is particularly adapted for use in conjunction with tank type vacuum cleaners. In cleaners of this type a tank or enclosure is provided which houses the suction motor as well as the dust receptacle in the form of a disposable filter bag. The tank is provided with a wall 28 through which inlet conduit 25 passes. Inlet conduit 25 is usually a rigid cylindrical tube, one end 29 of which projects into the interior of the tank for the purpose of receiving the filter bag in relatively air tight coupling relation therewith. The other end 30 of the inlet conduit extends externally of the tank and forms a coupling means for the attachment of an additional conduit or a flexible hose to which a cleaning tube or implement is then secured for use in the cleaning operation. Upon operation of the suction motor, dust laden air is drawn through inlet conduit 28 from whence it passes into the filter bag.

Filter bag 10 is formed of an air pervious filter paper or similar material which is sufficiently porous to permit the passage of air therethrough while preventing the passage of the entrained dust or similar material. The dust free air is thus withdrawn through the wall of the bag and passed to the external atmosphere by the suction motor. The dust thus collected within the bag is disposed of therewith as a unit upon removal therefrom. Porous filter media of the type which may be economically employed in a disposable filter bag are of limited strength. The bag is particularly subject to strain in the inlet region, at which point the mounting means therefor are usually secured, during the operation of the cleaner and while the bag is being handled for mounting or removal therefrom. An additional significant consideration in the construction of bags of this type is that although the mounting means must be capable of being manipulated with ease during mounting and removal of the bag from the cleaner, it must also form a relatively air tight seal with the end of the inlet conduit for the efficient functioning of the machine.

The interior bore or diameter of the mounting collar 26 is such as to provide a relatively air tight friction fit with the exterior surface of the end 29 of inlet conduit 25. In this connection it should be noted that in mounting the bag upon the end of the inlet conduit, the collar 26 is normally grasped by the hand along the external surface thereof and the collar is then forced on to the end of the inlet conduit. The hand pressure thus applied tends to deform the collar wall making it difficult to move the collar into position along the conduit. Furthermore, the use of a relatively thin wall collar thus deformed tends to destroy the air tight connection between these parts. The instant collar is intended to overcome this difficulty by being formed of a relatively thick walled laminated structure in the manner heretofore indicated so as to prevent the deformation of the collar while it is being manipulated during the mounting or removal process. Furthermore, the thick walled laminated structure permits the interior portion of the collar wall to be somewhat compressed as it is forced upon the inlet conduit so that it conforms itself to the configuration thereof and forms a more efficient friction fit and air seal. The laminations forming the collar tend to be compressed as the collar receives the conduit and thus provides an efficient frictional engagement therewith as well as the requisite air tight seal therebetween. By the same token any excessive hand pressure applied to the external peripheral surface of the collar is absorbed by the compacting action upon the external layers of the collar material so that under normal usage the interior lumen of the collar is not deformed thereby. In order to achieve this result, it has been found advantageous to form a collar of laminated material such as paperboard of approximately ¼ inch thickness. By the same token it has been found advantageous in order to achieve these and other advantages of this invention to utilize a sheet or strip material for forming the laminated collar having a thickness of less than .050 inch.

As heretofore indicated, the laminar end edge face 27 of the ring comprising the mounting collar 26 result in the formation of a more efficient and secure adhesive bond with the base wall of the bag. The ridge-like edge structure thus formed results in a more complete saturation of the fibers and additionally permits the adhesive to enter the crevices between the layers of material for a more secure mechanical bond therewith. A more even distribution of the adhesive is made possible, and consequently a uniform bond between the collar and the face wall is achieved. It has been found that the bond is able to withstand considerable more abuse than structures heretofore employed and that an increase of resistance to initiations of tears along the inner and outer circumference of the collar is achieved.

The diameter of the aperture 24 is smaller than the interior diameter or lumen of the collar 26 thereby resulting in an inwardly extending flange 32 formed of the material of the bag. By reason of this arrangement, the entire surface area of the end edge face of the collar is assured adhesive contact with the face wall and additionally the flange thus formed serves to reduce the possibility of tearing or breaking the adhesive bond along the interior of the collar. When the bag is positioned upon the end 29 of the inlet conduit 25, the paper flange abuts with the end surface of the conduit to aid in forming a more efficient seal. Should the collar be forced beyond this point on to the conduit, the flange is forced around the peripheral surface of the collar similarly aiding the seal.

Figure 4 illustrates a modified form of the invention wherein the tank wall 33 is provided with an inlet conduit 34 having an end portion provided with a circumferential bead 35. In order to accommodate the collar 37 to this type of inlet conduit, it is provided with a layer or sleeve of rubber or similar elastomeric material 36 which forms a lining therefor. In this form of the invention, as the collar is moved on to the beaded end of the conduit, the elastic action of the rubber permits it to be moved thereon and grasps the conduit wall and the bead to form a very effective mount therefor and seal therewith.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

I claim:

1. A dust receptacle for a vacuum cleaning device having an inlet conduit, said receptacle comprising a bag-like enclosure formed of a filtering material and being provided with an inlet aperture, an annular collar carried by said receptacle and surrounding said aperture adapted to be engaged with said inlet conduit, said collar comprising an annulus of laminated sheet material the edges of said sheets lying in a trans-axial plane and forming a planar end face therefor, said collar being secured to said receptacle by adhesive contact between said end face and the wall of said receptacle.

2. A dust receptacle for a vacuum cleaning device having an inlet conduit, said receptacle comprising a bag-like enclosure formed of a filtering material and being provided with an inlet aperture, an annular collar carried by said receptacle and surrounding said aperture adapted to be engaged with said inlet conduit, said collar comprising an annulus of laminated paper board sheets, the edges of said sheets lying in a trans-axial plane and forming a planar end face therefor, said collar being secured to said receptacle by adhesive contact between said end face and the wall of said receptacle.

3. A dust receptacle for a vacuum cleaning device having an inlet conduit, said receptacle comprising a bag-like enclosure formed of a filtering material and being provided with an inlet aperture, a collar carried by said receptacle and surrounding said aperture adapted to be mounted upon said inlet conduit, said collar comprising an annulus of convolutely wound sheet material adhesively secured together, one edge of said sheet material lying in a trans-axial plane and forming a planar face therefor of sufficient width to provide a substantial surface area for effective adhesive contact between said end face and the wall of said receptacle, said convolute construction forming interstices for the reception of the adhesive material.

References Cited in the file of this patent

UNITED STATES PATENTS

| | | |
|---|---|---|
| 1,586,868 | Webb | June 1, 1926 |
| 2,336,540 | Graves | Dec. 14, 1943 |
| 2,711,982 | Straka | June 28, 1955 |
| 2,766,844 | Humphrey | Oct. 16, 1956 |
| 2,792,076 | Meyerhoefer | May 14, 1957 |
| 2,808,898 | Meyerhoefer | Oct. 8, 1957 |
| 2,832,433 | Brace | Apr. 29, 1958 |